(12) United States Patent
Kaertner et al.

(10) Patent No.: US 8,194,709 B2
(45) Date of Patent: Jun. 5, 2012

(54) HIGH-REPETITION-RATE GUIDED-MODE FEMTOSECOND LASER

(75) Inventors: Franz X. Kaertner, Newton, MA (US); Hyunil Byun, Cambridge, MA (US); Jian Chen, Cambridge, MA (US); Erich P. Ippen, Belmont, MA (US); Dominik Pudo, Quebec (CA)

(73) Assignee: Massachusetts Institute of Technology, Cambridge, MA (US)

( * ) Notice: Subject to any disclaimer, the term of this patent is extended or adjusted under 35 U.S.C. 154(b) by 99 days.

(21) Appl. No.: 12/475,674

(22) Filed: Jun. 1, 2009

(65) Prior Publication Data

US 2009/0310631 A1 Dec. 17, 2009

Related U.S. Application Data

(60) Provisional application No. 61/112,487, filed on Nov. 7, 2008, provisional application No. 61/060,678, filed on Jun. 11, 2008.

(51) Int. Cl.
*H01S 3/10* (2006.01)
(52) U.S. Cl. .................. 372/25; 372/6; 372/21; 372/99
(58) Field of Classification Search ...................... 372/25
See application file for complete search history.

(56) References Cited

U.S. PATENT DOCUMENTS

| | | | |
|---|---|---|---|
| 5,450,427 A * | 9/1995 | Fermann et al. | 372/10 |
| 6,072,811 A | 6/2000 | Fermann et al. | |
| 6,078,597 A * | 6/2000 | Feuer | 372/6 |
| 6,097,741 A | 8/2000 | Lin et al. | |
| 6,307,872 B1 * | 10/2001 | Tomaru et al. | 372/34 |
| 6,778,565 B2 * | 8/2004 | Spuehler et al. | 372/25 |
| 7,106,764 B1 | 9/2006 | Weingarten et al. | |
| 7,251,258 B2 | 7/2007 | Wise et al. | |
| 2002/0176472 A1 * | 11/2002 | Arbore et al. | 372/72 |

FOREIGN PATENT DOCUMENTS

WO WO-2004/059806 A2 7/2004

OTHER PUBLICATIONS

Bergman K. et al.: "Multi-gigahertz femtosecond fiber lasers by passive mode locking", SPIE, vol. 3542, 1998, pp. 2-7.*
Byun, Hyunil, et al., "Integrated, Low-Jitter, 400 MHz Femtosecond Waveguide Laser," *IEEE Lasers and Electro-Optics Society, 2008, 21st Annual Meeting of the*, 591-92 (Nov. 9-13, 2008).

(Continued)

*Primary Examiner* — Jessica Stultz
*Assistant Examiner* — Xinning Niu
(74) *Attorney, Agent, or Firm* — Modern Times Legal; Robert J. Sayre (57) ABSTRACT

Femtosecond pulse trains in waveguide lasers with high fundamental repetition rates are achieved by exploiting the nonlinearity in the waveguide. Components of the apparatus include an optical resonator, a saturable absorber for starting and stabilizing mode-locking, and a gain element. Part of the laser cavity or the entire laser cavity is made of waveguide or fiber (collectively called "waveguide" herein). The net dispersion of the laser cavity can be anomalous. This anomalous dispersion in combination with the positive self-phase modulation nonlinearity in the waveguide creates soliton formation to shorten the pulse duration in the invented lasers. Conversely, a normal dispersive waveguide with negative self-phase modulation nonlinearity can also be used.

25 Claims, 9 Drawing Sheets

OTHER PUBLICATIONS

Pudo, Dominik, et al., "Scaling of Passively Mode-Locked Soliton Erbium Waveguide Lasers Based on Slow Saturable Absorbers," *Optics Express*, vol. 16, No. 23, 19221-231, (Nov. 10, 2008).

Bergman, K. et al., "Multi-Gigahertz Femtosecond Fiber Laser by Passive Modelocking", *SPIE* vol. 3542, Nov. 1998, pp. 1-6.

European Patent Office, International Search Report and Written Opinion for Application No. PCT/US2009/045816 (related PCT application), May 7, 2010, pp. 1-18.

Grudinin, A. B. et al., "Passive harmonic mode locking in soliton fiber lasers", *Journal of the Optical Society of America*, vol. 14, No. 1, Jan. 1997, pp. 144-154.

Islam, M. N. et al., "Special erbium fiber amplifiers for short pulse switching, lasers, and propagation", *Journal of Lightwave Technology*, vol. 12. No. 11, Nov. 1994, pp. 1952-1962.

Song, Yong-Won et al., "Carbon nanotube mode lockers with enhanced nonlinearity via evanescent field interaction in D-shaped fibers", Optics, vol. 32, No. 2, Jan. 15, 2007, pp. 148-150.

* cited by examiner

HIGH-REPETITION-RATE GUIDED-MODE FEMTOSECOND LASER

RELATED APPLICATIONS

This application claims the benefit of U.S. Provisional Application No. 61/060,678, filed Jun. 11, 2008, and U.S. Provisional Application No. 61/112,487, filed Nov. 7, 2008, the entire content of each of which is incorporated herein by reference.

GOVERNMENT SUPPORT

The invention was supported, in whole or in part, by grants, numbers W911NF-04-1-0431 and HR0011-05-C-0155 from the Defense Advanced Research Projects Agency as well as by grant number FA9550-07-1-0014 from the Air Force Office of Scientific Research. The United States Government has certain rights in the invention.

BACKGROUND

Many different devices and methods have been demonstrated to mode-lock a laser to generate an optical pulse train from the laser. These devices and methods include both active mode-locking and passive mode-locking approaches.

Active mode-locking uses an amplitude modulator inside the cavity to modulate a loss at a rate equal to the laser round-trip frequency, resulting in a pulse train. Though relatively simple to design and implement, active mode-locking has several limitations. One of the major disadvantages of active mode-locking is the difficulty of scaling down the pulse width; the pulse width generally ranges from several picoseconds to tens of picoseconds for active mode-locking.

On the other hand, in passive mode-locking, a device with intensity-dependent loss (generally referred to as a "saturable absorber") is placed in the cavity. If the loss decreases with increasing intensity, pulse formation is favored. Passive mode-locking generates much shorter pulses than does active mode-locking because the pulse inside the laser self-modulates itself more rapidly than it does in any active modulation. Depending on how fast the saturable absorber recovers to its default state after being saturated by a single pulse with a given pulse width, it is classified either as a slow saturable absorber (SSA) or as a fast saturable absorber (FSA). The slow saturable absorber has a recovery time longer than the pulse width of the saturating pulse, while the fast saturable absorber has a shorter recovery time.

For femtosecond pulse generation, the slow saturable absorber is generally implemented in the form of a compact semiconductor saturable absorber mirror with widely adjustable parameters for mode-locking various kinds of lasers. In passive mode-locking using a slow saturable absorber, the width of the generated pulses is generally limited from a picosecond to several picoseconds. In addition, when the absorber parameters are inappropriate, the laser can operate in Q-switched mode-locking where the pulse train is modulated with a frequency much lower than the cavity round-trip time.

The fast saturable absorber is generally implemented in the form of an artificial saturable absorber using a nonlinear phase shift. A femtosecond pulse (i.e., a pulse having a width of 1-500 femtoseconds; e.g., a pulse in a fiber with a pulse width in the range from 50 to 200 femtoseconds) is generally generated based on the fast-saturable-absorber mechanism by Kerr-lens mode-locking, additive-pulse mode-locking, and nonlinear-polarization-rotation mode-locking.

Femtosecond sources with multi-gigahertz repetition rates at optical communications wavelengths are important building blocks for numerous applications, such as femtosecond laser frequency comb generation for frequency metrology, optical arbitrary waveform generation, high-speed optical sampling, and the calibration of astrophysical spectrographs. Currently, only a few approaches meet the stringent requirements in terms of pulse duration, repetition rate, operating wavelength, and noise performance simultaneously. These current approaches, however, are bulky, expensive and of limited robustness because they employ external Fabry-Perot filters locked to the mode comb for multiplying the repetition rate to the multi-gigahertz range, either inside or outside of the low-fundamental-repetition-rate laser cavities.

With the constraints of achieving femtosecond pulse duration and low timing jitter, passive mode-locking provides a path to reach a multi-gigahertz fundamental repetition rate. Record-high repetition rates of a few hundred MHz have been reported in previous attempts using polarization additive pulse mode-locking (P-APM). Additionally, passively mode-locked fiber lasers using saturable Bragg reflectors (SBRs) with repetition rates up to 2 GHz have been reported. These attempts, however, failed to produce femtosecond pulses, which are important for low-jitter and for frequency-metrology applications.

SUMMARY

Various embodiments of this invention, as characterized in the claims, may include some or all of the apparatus, methods, elements, features and steps described below.

A high-repetition-rate guided-mode femtosecond laser that can produce a soliton with both a very-short pulsewidth and a very-high repetition rate includes a laser cavity containing a saturable absorption device, a reflector, and a waveguide extending between the saturable absorption device and the reflector.

The soliton can be achieved by providing a waveguide and other cavity components that provide a high absolute value for nonlinearity and a low absolute value of dispersion in a small laser cavity. Specifically, optical pulses can be generated that are very short (e.g., with a duration of no more than 400 or 500 femtoseconds—e.g. 1-500 fs) and that have a high repetition rate (e.g., at least 500 MHz or 1 GHz and higher). The unique combination of short pulses and a high repetition rate is achieved, in part, by constructing a very-small laser cavity and by producing a soliton in the cavity. The laser cavity is bounded by a saturable absorption device and a partial reflector; and the light is transmitted through the cavity within a waveguide (rather than in free space, as is more typical) between the saturable absorber and the partial reflector.

The soliton wave is generated in the waveguide by balancing the non-linearity and dispersion in the waveguide and in other components. This balancing is needed to produce the high-repetition-rate soliton because increasing the repetition rate decreases the energy per pulse in the waveguide. Moreover, a slow saturable absorber having a "recovery time" less than the very-limited time between pulses in the cavity (e.g., no more than 10 ps or less than 10 or 20 times the soliton pulse width) can be advantageously utilized.

In the experimental implementations, a compact, multi-gigahertz, fundamentally mode-locked erbium-doped fiber laser is demonstrated herein to produce femtosecond-duration pulses. The output pulse train from the laser exhibits a low timing jitter of 19 fs [10 kHz-40 MHz] enabling the laser to be used in a range of applications from frequency metrology, arbitrary optical waveform generation, high-speed sampling and calibration of astrophysical spectrographs. The laser can further be used to achieve even shorter pulses and higher fundamental repetition rates beyond 10 GHz. The waveguide(s) in the laser can enhance nonlinearity, and the provision of a small laser cavity in this laser enables the generation of amplified pulses at a high repetition rate. Moreover, the laser can be of a design that is simple, compact, robust and cost-efficient; and it can produce a high gain as a function of cavity length.

Accordingly, a clear pathway to high-repetition-rate femtosecond lasers is herein identified through soliton formation; and, as discussed in the following text, a variety of variables can be manipulated to obtain a soliton within the confines of a small cavity while also maintaining a targeted average laser power by reducing pulse energy via a reduced absolute value for dispersion and an increased absolute value for nonlinearity.

BRIEF DESCRIPTION OF THE DRAWINGS

The drawings are not necessarily to scale, emphasis instead being placed upon illustrating particular principles, discussed below.

DETAILED DESCRIPTION

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. For example, if a particular composition is referenced, practical, imperfect realities may apply; e.g., the potential presence of at least trace impurities (e.g., at less than 0.1% by weight or volume) can be understood as being within the scope of the description.

Although the terms, first, second, third, etc., may be used herein to describe various elements, these elements should not be limited by these terms. These terms are only used to distinguish one element from another. Thus, a first element, discussed below, could be termed a second element without departing from the teachings of the exemplary embodiments.

Spatially relative terms, such as "above," "upper," "beneath," "below," "lower," and the like, may be used herein for ease of description to describe the relationship of one element to another element, as illustrated in the figures. It will be understood that the spatially relative terms are intended to encompass different orientations of the apparatus in use or operation in addition to the orientation depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly.

The terminology used herein is for the purpose of describing particular embodiments only and is not intended to be limiting of exemplary embodiments. As used herein, the singular forms "a," "an" and "the" are intended to include the plural forms as well, unless the context clearly indicates otherwise. Additionally, the terms, "includes," "including," "comprises" and "comprising," specify the presence of the stated elements or steps but do not preclude the presence or addition of one or more other elements or steps.

1. Definitions

Laser: A laser is a physical process producing coherent emission or a device used to implement the process. A laser device includes a gain medium, a resonant cavity, a pumping method with an energy source, and an output signal. The output signal leaks from the laser device through either partially reflective mirrors or through coupling elements that purposefully extract a fraction of the intracavity light.

Gain medium: A gain medium is a material or device (e.g., a waveguide) used to amplify light. In a specific gain medium, the lasing wavelength is within a particular range, proper to that gain medium.

Passive mode-locking: Passive mode-locking is a physical process wherein a laser is operated in such a way that the laser generates short optical pulses without the need of any external device controlling such pulses. Passive mode-locking relies upon the presence of an enabling optical device or effect, such as a real or artificial saturable absorber.

Soliton: A soliton is a type of optical pulse that maintains its shape as a function of time while propagating in nonlinear and dispersive media.

Saturable absorption: Saturable absorption is a process that favors the propagation or reflection of high-intensity optical signals while discriminating low-intensity optical signals. Saturable absorption is often provided by a component in a passively modelocked laser and is usually implemented using semiconductor saturable absorbers or reflectors.

Saturable absorption device: A saturable absorption device is a device that implements the process of allowing high-intensity light to pass or reflect while attenuating low-intensity light. In addition to semiconductor saturable absorbers/reflectors, other implementations for saturable absorption, such as nonlinear interferometers (also referred to herein as "artificial saturable absorbers") are included as "saturable-absorption devices."

2. Introduction

The average power of any laser is limited by the pump power (whether electrically or optically pumped), heat dissipation, and material damage threshold, etc. Consequently, there is a hard limit as to how much average power a laser can build up in the laser cavity and emit, and that limit depends on the type of the laser. The relationship between pulse energy and average power of a fundamentally modelocked laser is as follows:

$$P_{ave} = WR. \tag{1}$$

As expressed in the above equation, the average power, $P_{ave}$ (in Watts), equals the product of the pulse energy, $W$ (in Joules), and the repetition rate, $R$ (in Hertz).

In general, one increases the repetition rate of the laser without changing the pulse energy, since shortening the cavity length (i.e., increasing the repetition rate) does not necessarily change the pulse energy that can be sustained in the laser cavity. As a result, when the repetition rate increases, the average power increases. When the repetition rate rises to the multi-gigahertz region, especially in erbium-based light sources, the average power hits a hard limit unless the pulse energy is reduced to decrease the average power. Scaling the repetition rate of a passively mode-locked soliton erbium waveguide laser to higher rates is discussed in D. Pudo, et al., "Scaling of Passively Mode-Locked Soliton Erbium Waveguide Lasers Based on Slow Saturable Absorbers," Optics Express, Vol. 16, No. 23, pp. 19221-19231 (10 Nov. 2008).

Balancing the nonlinearity and dispersion in the laser cavity enables mode-locking into femtosecond pulses and formation of a soliton. Soliton formation strongly facilitates the generation of femtosecond pulses at reduced pulse energy because the pulse energy is dictated by the following soliton equation:

$$\frac{P_{ave}}{R} = W = \frac{2|\beta_2|}{|\gamma| \cdot \tau}. \tag{2}$$

In the above equation, $P_{ave}$ is average power; R is repetition rate; W is pulse energy (i.e., the integrated energy under a pulse shape); $\beta_2$ is the second-order dispersion (measured in ps$^2$/km and may have a low absolute value), and its absolute value is utilized in this equation; $\gamma$ is nonlinearity of the waveguide or fiber [measured in (km*watt)$^{-1}$ and having a high absolute value]; and $\tau$ is pulse duration (measured in picoseconds). If we use the dispersion value, D, which is $\beta_2$*l, where l is the length of the waveguide, and the nonlinear value, $\delta$, which is $\gamma$*l, we have:

$$W = \frac{2|D|}{|\delta| \cdot \tau}. \tag{3}$$

Dispersion, D, is the sum of the respective dispersion contributions from each of the saturable absorber, the waveguide, and the reflector.

Hence, the dispersion and nonlinearity can be engineered, specifically in waveguide structures, to make the pulse energy small enough such that the required average power at a given repetition rate is still achievable. For example, the dispersion can be engineered by changing the composition of the waveguide (e.g., a glass with a dopant) or by changing the waveguide dimensions. Nonlinearity can be increased providing a more confined (smaller cross-section) waveguide. The dispersion, however, can not be made arbitrarily small. There must be strong enough soliton pulse shaping per cavity roundtrip compared to all other pulse shaping mechanisms, such as the filtering by the finite gain bandwidth.

3. Laser Cavity Configurations

Figure 1:
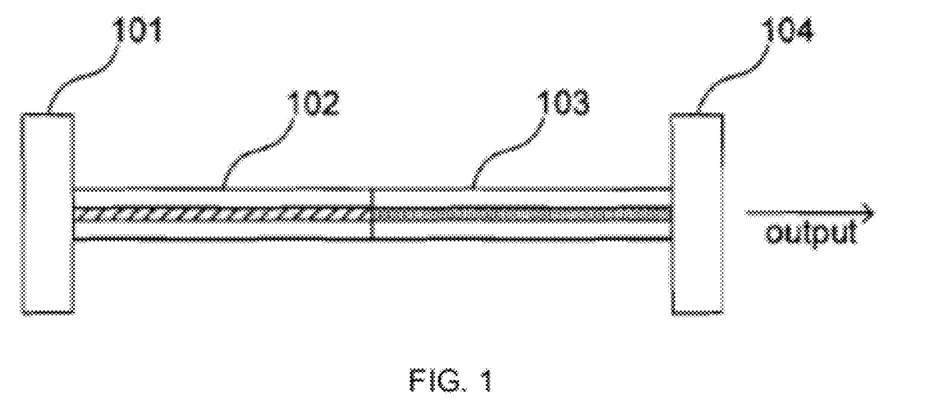
FIG. 1 is a schematic illustration of a linear waveguide laser.

A first embodiment of the laser is shown in FIG. 1. The optical resonator includes a saturable absorber 101, an active waveguide (e.g., a highly doped erbium or erbium-ytterbium fiber) that functions as the gain medium 102, an optional passive waveguide section 103, and a partial reflector 104. The passive waveguide section can be made of single-mode fiber or a phosphorous-doped silica waveguide cladded with plain silica glass; and the partial reflector can be implemented by dielectric coatings, fiber gratings or loop mirrors. The combined length of the active and passive waveguide can be 6 cm or less. The saturable absorber 101 can be a semiconductor saturable absorber mirror, a carbon nanotube saturable absorber, or an artificial saturable absorber. The partial reflector 104 serves as the gateway for the optical pump light to be fed through the partial reflector into the active waveguide (gain medium) in the cavity and for the soliton to leave the cavity through the partial reflector.

The length of the active waveguide is set to achieve a certain repetition rate and to absorb the required pump energy, and the waveguides 102 and 104 can fill the entire light path (with no free space) between the saturable absorber 101 and the partial reflector 104. The active waveguide and passive waveguide can be either positive (normal) dispersive or negative (anomalous) dispersive. Inclusion of the passive waveguide enables fine-tuning of the total dispersion or nonlinearity, where, for example, a limited selection of doping concentrations is available for the active waveguide section (i.e., the passive waveguide can boost, moderate or reverse the sum dispersion or nonlinearity).

Where the cavity, in sum, exhibits anomalous dispersion (where the refractive index increases with increasing wavelength—i.e., light with a shorter wavelength travels faster), the nonlinearity of the waveguide is positive. In contrast, where the cavity, in sum, exhibits normal dispersion, the nonlinearity of the waveguide is negative. For certain applications, the passive waveguide, which adds to the length of the waveguide and therefore reduces the repetition rate, can be omitted as long as the desired total-cavity dispersion is obtained.

The total intra-cavity positive nonlinearity (i.e., the nonlinear response of the dielectric polarization of the waveguide to the electric field of the light) and anomalous dispersion in combination creates soliton formation. Alternatively, a soliton can be formed where the intra-cavity dispersion is positive (normal), in which case, the nonlinearity is engineered to be negative. In particular, the laser design can include combined structures that will produce a very-low absolute value for optical dispersion and a very-high absolute value for optical nonlinearity, particularly by utilizing the waveguides in the laser cavity to manipulate the nonlinearity and dispersion.

Total dispersion in the cavity is the sum of (a) the dispersion generated by the waveguide composition, (b) the dispersion resulting from the dimensions of the waveguide (dispersion increases with smaller cross-sections), and (c) dispersion generated by the saturable absorber and reflector. In particular embodiments, the waveguide can provide anomalous (negative) dispersion, while a waveguide with constricted dimensions can produce normal (positive) dispersion; and, in particular embodiments, a waveguide with anomalous dispersion can be coupled and balanced with a waveguide having normal dispersion to produce a sum dispersion close to zero. Increased doping of the waveguide composition can also increase the dispersion. The sum dispersion can also be manipulated not just in the waveguide(s) but also by adjusting the dispersion in the saturable absorber and in the partial reflector mirror. For example, one or more coatings can be provided on the surface of the reflector to adjust the dispersion or to provide normal or anormal dispersion.

Nonlinearity in the laser can be adjusted by manipulating the cross-sectional dimensions of the waveguide, where the nonlinearity reaches a peak within a particular size range. For example, down to a given size range, the nonlinearity of the waveguide increases with increasing constriction of waveguide dimensions normal to the direction that light travels in the waveguide; though if the dimensions are too small, a substantial portion of the light is guided outside the waveguide. Achieving the desired high nonlinearity can be viewed as a particular challenge in this context given that nonlinearity generally decreases with the inverse square of the repetition rate, which is high in this case. A passive waveguide can also be added to further adjust the nonlinearity (as well as the dispersion) beyond what can be obtained from the active waveguide and other components.

The repetition rate of the laser can be controlled by adjusting the temperature in the cavity.

The pump light for the laser can be introduced into the laser cavity from outside the cavity (through the partial reflector), and the output pulse can be extracted from the laser cavity through the partial reflector. Removing the input and output light couplers from the cavity (as found in previous designs) allows the size of the cavity to be further shrunk and, consequently, increases the repetition rate that can be achieved. In short, the combination of the above-described components and configurations enables production of an extremely small cavity that can nevertheless produce a stream of solitons with a short pulse length and at high repetition rate.

This soliton formation effect enables the production of femtosecond-duration pulses from this laser and/or suppression of mode-locked Q-switching instabilities. A femtosecond laser incorporating this embodiment has been implemented at 3.2 GHz repetition rate.

Figure 2:
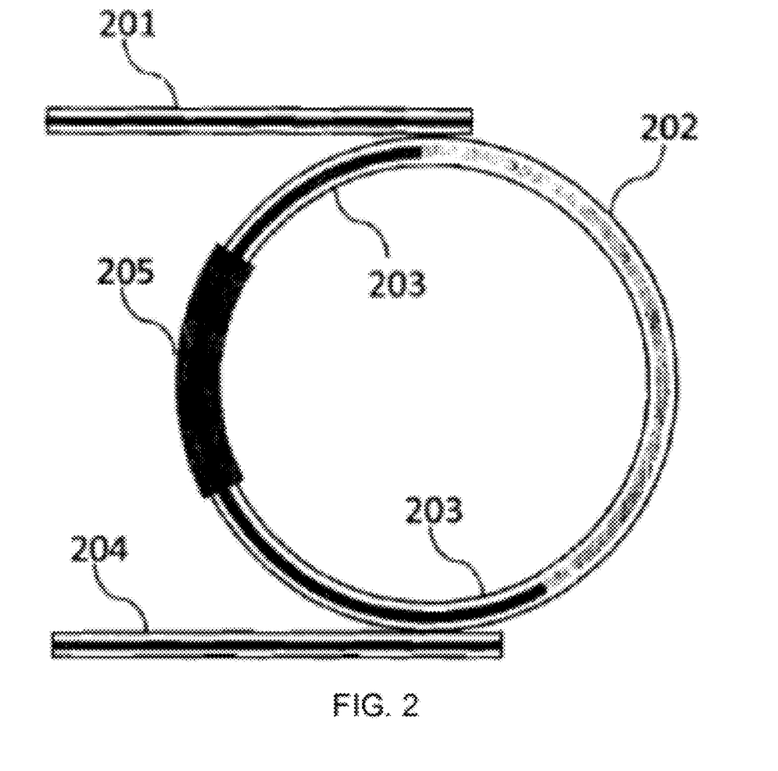
FIG. 2 is a schematic illustration of a ring waveguide laser.

Another embodiment of the laser is shown in FIG. 2. The optical resonator has a ring cavity configuration, comprising an optical coupler 201 to couple pump power into the cavity. The optical coupler 201 can be eliminated in certain gain media that are not optically pumped. The laser also includes an active waveguide that functions as a gain medium 202, an optional passive waveguide 203 section, an output coupler 204, and a saturable absorber section 205. The saturable absorber 205 can be a semiconductor saturable absorber mirror, a carbon nanotube saturable absorber, or an artificial saturable absorber. The length of the active waveguide 202 is determined such that the optical resonator is energized at a desired level. The active waveguide 202 and passive waveguide 203 can again be either positive (normal) dispersive or negative (anomalous) dispersive. The length and the dispersion of the waveguides 202 and 203 can be set such that the optical resonator has anomalous (or normal) dispersion in total. In some applications, the passive waveguide 203 can be omitted as long as the desired total cavity dispersion is obtained.

The total intracavity nonlinearity and dispersion in combination results in a soliton formation effect to increase the nonlinear pulse formation (i.e., to increase spectral generation). This soliton formation effect enables the achievement of femtosecond duration pulses. The use of this effect is particularly advantageous for high-repetition-rate lasers, since the intracavity pulse energy is typically lower than it is for lower-repetition-rate lasers; and, therefore, nonlinear effects are weaker. The waveguide further increases the nonlinear interaction of the pulse.

This laser can be distinguished from previous mode-locked lasers for the following reasons. First, the laser beam is guided along a waveguide structure in the laser cavity. In previous lasers using bulk material as gain medium, the laser beam typically is not guided inside the optical resonator. When the laser beam is not guided, the mode volume is usually much larger than that of the laser beam propagating through the waveguide, and the corresponding nonlinear self-phase shift is not enough at high repetition rates to sustain soliton formation. Second, the optical resonator has net negative or net positive dispersion, depending on the sign of the self-phase modulation, to accommodate soliton formation together with the waveguide self-phase modulation. In previous mode-locked waveguides or other lasers, the dispersion of the cavity can be either negative or positive to enable soliton formation. Negative or positive dispersion can balance a positive or negative self-phase modulation to form solitons for achieving femtosecond pulse generation while avoiding Q-switching instabilities.

In one embodiment, the laser cavity includes micro-structured or nano-structured materials, such as photonic crystals, to engineer the dispersion and/or nonlinearity of the laser cavity.

4. Saturable Absorption Device

Figure 3:
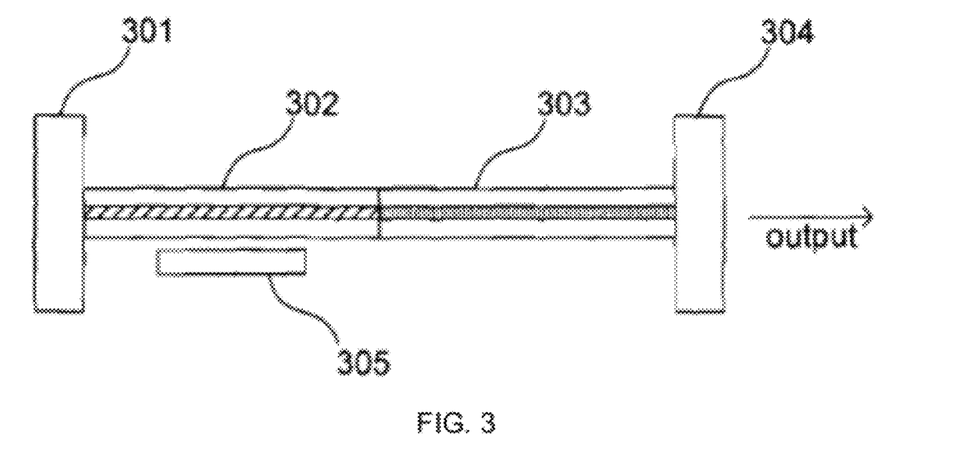
FIG. 3 is a schematic illustration of a planar saturable absorber.

One embodiment of a saturable absorption device is shown in FIG. 3. The optical resonator comprises a partial or complete reflector 301, an active waveguide that functions as gain medium 302, a passive waveguide 303, a partial reflector 304, and a saturable absorber 305. This embodiment is mostly the same as the first embodiment except that the saturable absorber 305 is located within a distance of 5 to 50 nm of the active waveguide or passive waveguide such that it interacts with the electric field of the pulse guided in the waveguide. The saturable absorber 305 is saturated by the field of the laser beam propagating through the waveguide and reaching the absorber. The thickness of the saturable absorber 305 and the distance from the active waveguide can be adjusted such that the desired amount of laser light is absorbed.

This embodiment is easier to monolithically integrate on a wafer in a planar waveguide configuration since all components can be planar. The partial reflector 304 can also be fabricated in a planar structure using a loop mirror structure.

5. Kerr Effect Saturable Absorber Laser Configuration

Figure 4:
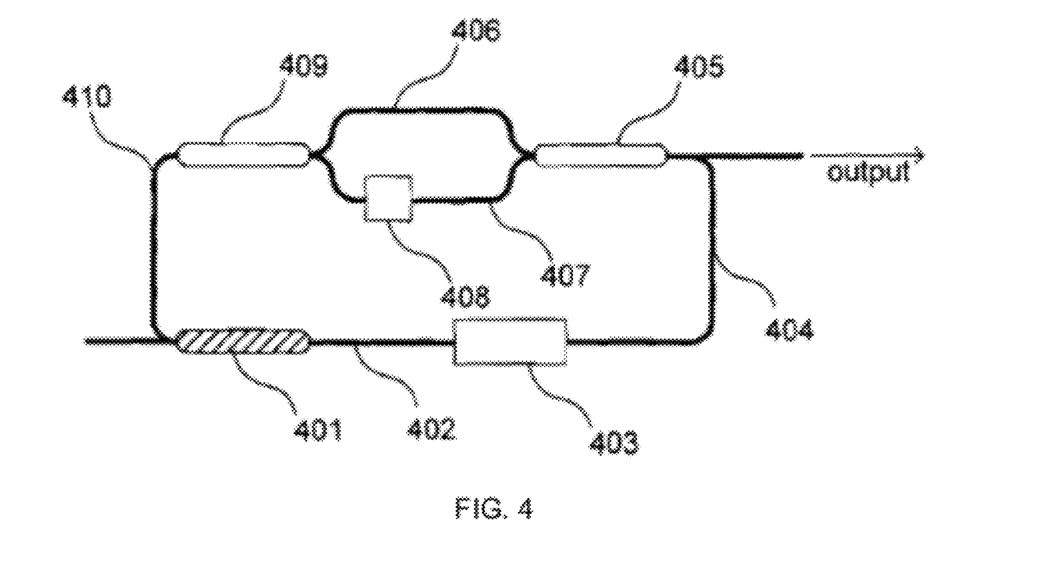
FIG. 4 is a schematic illustration of an embodiment of a Kerr effect saturable absorber.

An embodiment of a guided-mode femtosecond laser with a Kerr-effect-based configuration of an artificial saturable absorber (where the refractive index changes in proportion to the square of the electric field) to achieve mode-locking is shown in FIG. 4. The optical resonator is in a ring configuration and is composed of a wavelength-division multiplexing coupler 401; an active waveguide that functions as a gain medium 402; directional couplers 405 and 409; and passive waveguide sections 404, 406, 407 and 410. The optical resonator also optionally comprises an optical isolator 403 and an apparatus, such as a heating pad 408, for inducing an optical phase change over the waveguide 407.

Initially, there is only noise over the laser cavity. Greater-magnitude noise experiences less loss through the artificial saturable absorber (comprising, in this embodiment, couplers 405 and 409, waveguides 406 and 407, and heating pad 408) than does lower-magnitude noise to thereby, after some time, produce short pulses.

This embodiment is distinguished from the previous embodiments involving mode-locked lasers due to the lack of real saturable absorbers. The principle of operation of the artificial saturable absorber is as follows. The optical signal enters the coupler 409 and is split into the waveguides 406 and 407 and then rejoined in coupler 405. In this method, the optical signal propagating in the waveguide 406 acquires a different self-phase modulation nonlinear phase shift from that of the optical signal propagating in the waveguide 407. The nonlinear phase shift is a physical effect affecting an optical signal propagating through a waveguide and depends on (a) the intensity of the optical signal in the optical waveguide and (b) the nonlinear coefficient of the optical waveguide. The nonlinear coefficient is, in turn, dependent on the material and cross-sectional area of the optical waveguide. Consequently, in the artificial saturable absorber, different optical intensities are coupled into the waveguides 406 and 407 from coupler 409 or the waveguides 406 and 407 have different nonlinear coefficients. The optical isolator 403 permits light to pass only one way. In this embodiment, the light passes only from the right side of the optical isolator 403 to the left such that the pulse travels the ring cavity in a clockwise direction only. Without the isolator 403, a single pulse can build up in either a clockwise or a counter-clockwise direction; and the direction the pulse travels is completely random, though the pulse keeps traveling in one direction once it is formed. By using the optical isolator 403 with an orientation of the light path from right to left, the pulse travels clockwise and we can expect the pulse output from the coupler 405. With a reverse orientation of the isolator 403, the pulse travels counter-clockwise and the pulse output can be taken out from the coupler 409, in which case a fourth port should be added to the coupler 409. The wavelength-division multiplexing coupler 401 combines or splits optical signals at different wavelengths. In this method, the left unconnected port of the WDM coupler 401 accepts pulses from a pump source, while pulse signals can also travel from a second port on the left side of the WDM coupler 401 to a port on the right side of the WDM coupler 401, or vice versa.

Figure 5:
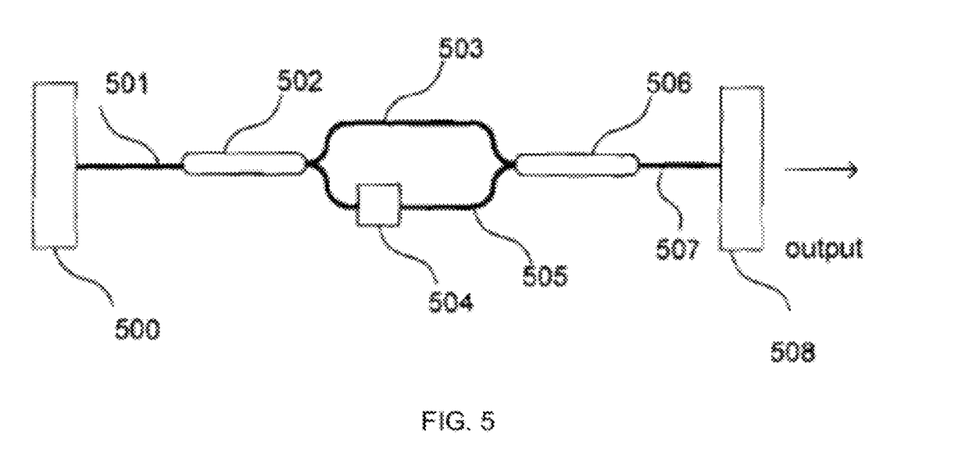
FIG. 5 is a schematic illustration of a second embodiment of a Kerr effect saturable absorber.

A second embodiment of the Kerr-effect-based configuration, including an artificial saturable absorber comprising couplers 502 and 506, waveguides 503 and 505, and heating pad 504, is shown in FIG. 5. The optical resonator is in a linear configuration and comprises a partial or complete reflector 500; directional couplers 502 and 506; passive waveguide sections 501, 503 and 505; an active waveguide that functions as a gain medium 507; and a partial reflector 508. The optical resonator also optionally comprises an apparatus designed to induce an optical phase change over a waveguide 505, such as a heating pad 504. This embodiment is distinguished from the embodiment of FIG. 4 due to a linear optical resonator layout. The optical signal exits the apparatus through the partial reflector 508.

Figure 6:
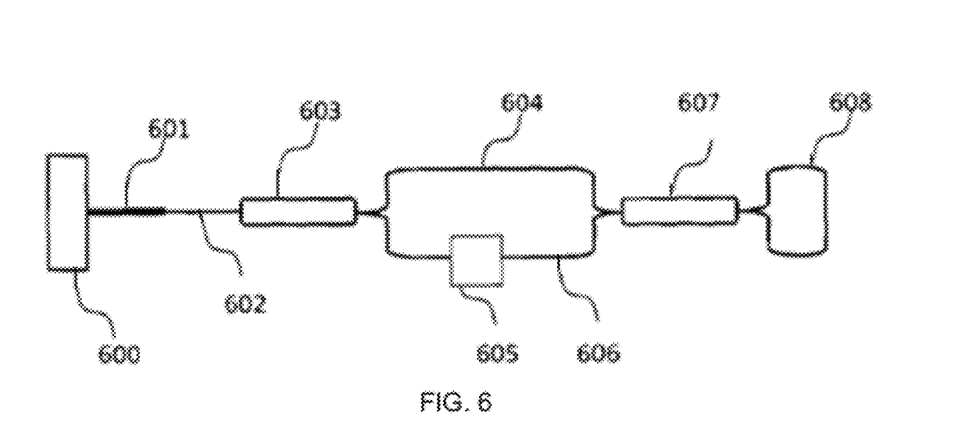
FIG. 6 is a schematic illustration of a third embodiment of a Kerr effect saturable absorber.

A third embodiment of the Kerr-effect-based configuration is shown in FIG. 6. The optical resonator is in a linear configuration and comprises a partial or complete reflector 600; directional couplers 603 and 607; passive waveguide sections 602, 604, 606 and 608; and an active waveguide that functions as gain medium 601. The optical resonator also optionally comprises an apparatus designed to induce an optical phase change over waveguide 606, such as a heating pad 605. This embodiment is distinguished from the embodiment of FIG. 5 due to the reflective mirror being replaced by a reflector in the form of a section of loop waveguide 608 attached to a directional coupler 607, thereby providing the same functionality as the reflective mirror. Optionally, the reflector 600 can also be replaced by a directional coupler and loop waveguide configuration, equivalent to 607 and 608.

6. Experimental Implementation #1

6.1 Experiment Introduction

In this experiment, a fundamentally mode-locked femtosecond erbium-doped fiber laser (EDFL) with a repetition rate of 3.2 GHz and a timing jitter of 19 fs [10 kHz-40 MHz] was demonstrated. This result exceeds previous attempts to increase the repetition rate of fiber lasers by about tenfold and sets a clear pathway to achieving low-timing-jitter, mode-locked femtosecond sources at 1550 nm with a repetition rate up to ten GHz.

6.2 Design Considerations

Since the cavity length of a multi-gigahertz-repetition-rate laser is only several centimeters, the polarization-additive pulse mode-locking (P-APM) mechanism is too weak; mode-locking by a saturable Bragg reflector (SBR) is, however, possible. SBR mode-locking only results in femtosecond pulses when soliton pulse shaping—governed by Eq. (3), above—is employed. The average power and, therefore, pulse energy is limited by the available pump power and doping concentration of the gain fiber. In order to generate the shortest pulse duration, $\tau$, with limited pulse energy, W, the cavity dispersion, D, is minimized; and the cavity nonlinearity is maximized. Note that D is kept negative for soliton formation.

Fortunately, unlike traditional fiber lasers, dispersion of the fiber section no longer dominates the total cavity dispersion for multi-gigahertz lasers. Other components, such as the saturable Bragg reflector, play important roles for dispersion compensation. It is also advantageous to keep the finesse of the laser cavity high to increase pulse energy.

6.3 Experimental Setup

Figure 7:
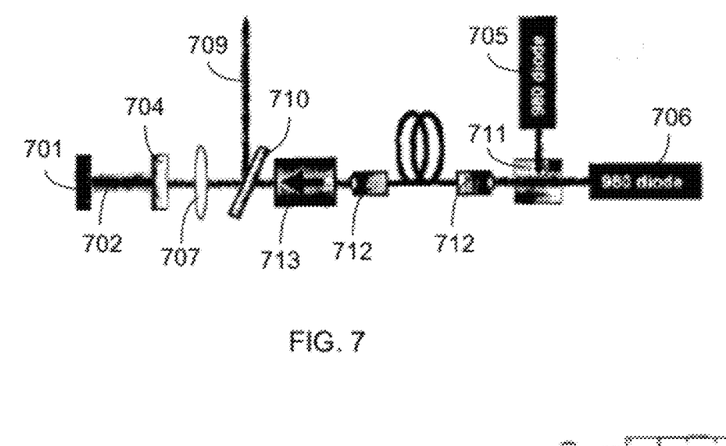
FIG. 7 shows an experimental setup.

The experimental setup is shown in FIG. 7. Guided by a simulation based on the above considerations, a 3-cm-long highly doped erbium-ytterbium fiber (from NP Photonics of Tucson, Ariz., US) with a group-velocity dispersion (GVD) of −60 $fs^2$/mm and a nonlinear coefficient of about 3 $W^{-1}km^{-1}$ was chosen as the active waveguide (gain medium) 702. An erbium-doped laser produces a pulse with a wavelength of 1.5 μm, while an ytterbium-doped laser produces a pulse with a wavelength of 1.0 μm. Meanwhile, a co-doped erbium-ytterbium fiber emits at the 1.5-μm wavelength of an erbium-doped fiber, though the ytterbium serves as a sensitizer, providing greater absorption. One end of the gain fiber 702 was butt-coupled to a saturable Bragg reflector a SAM-1550-9-0-2ps saturable absorber mirror from Batop GmbH of Jena, Germany) acting as the fast saturable absorber 701, and the other end was coupled to a 2% dielectric output coupler 704 (custom-coated from Laseroptik GmbH of Garbsen, Germany). A saturable Bragg reflector 701 having a dispersion that was slightly positive with 1000 $fs^2$ was chosen to compensate about half of the negative dispersion from the gain fiber 702. The saturable Bragg reflector 701 also had a 6% modulation depth, a 2 ps recovery time, and a saturation fluence of 25 $\mu J/cm^2$. Pump light was provided by two polarization-combined 500-mW 980-nm-laser diodes 705 and 706 (diodes 29-7702-500 from JDS Uniphase Corporation of Milpitas, Calif., US) fed through a polarization beam combiner 711 (FOBS-12P-111-6/125-SPP-980-PBS-50-XXX-1-1 from OZ optics of Ottawa, Ontario, Canada), collimators 712 (LPC-04-1550-6/125-S-1.3-3.9as-60-3a-1-1 from OZ optics of Ottawa, Ontario, Canada), and an isolator 713 (IO-3-λ-VLP from OFR Inc. of Caldwell, N.J., US) and free-space coupled via an aspherical lens 707 (C220TME-C from Thorlabs of Newton, N.J., US) into the gain fiber 702 through the output coupler 704. Two laser diodes were used here to inject enough power beyond the limited power of a single diode. The output signal was separated from the pump light by a dichroic mirror 710 (custom-coated from Laseroptik GmbH of Garbsen, Germany).

Figure 8:
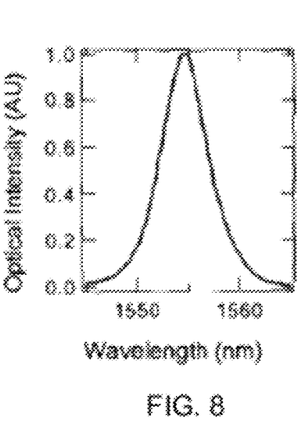
FIG. 8 shows the optical spectrum of the pulse train from the experimental setup of FIG. 7.
Figure 9:
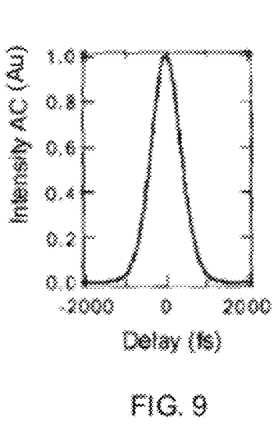
FIG. 9 shows the intensity autocorrelation measurement of the pulse train after amplification in the experimental setup of FIG. 7.

This setup was simple, compact, and self-starting; and the laser could be made reliable in a turn-key configuration. When the laser was pumped with about 700 mW of 980-nm pump power, the mode-locked optical spectrum was 5.3-nm wide, as shown in FIG. 8, which charts the optical intensity in arbitrary units. FIG. 9 shows the intensity autocorrelation (in arbitrary units) of the pulse train after amplification by an erbium-doped fiber amplifier, resulting in a pulse duration of 600 fs, which was limited by the dispersion compensation of the amplifier. The average output power from the laser cavity was 2 mW, and the output was used to seed a subsequent erbium-doped fiber amplifier for applications demanding higher average power. The intracavity average power was calculated to be 100 mW, yielding a pulse energy of 33 pJ. These numbers agree relatively well with soliton theory and with our simulations.

Figure 10:
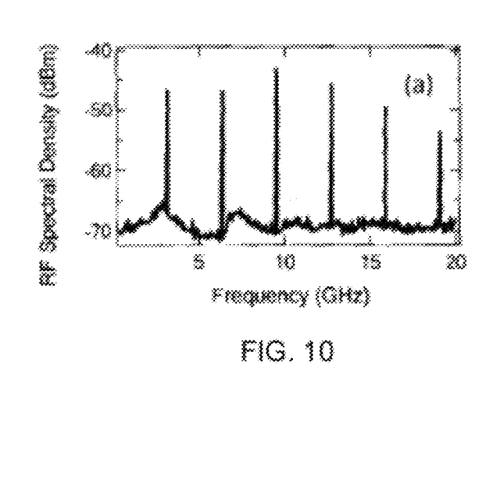
FIG. 10 shows the measured radiofrequency spectrum of the output pulse train with a span of 20 GHz from the experimental setup of FIG. 7.
Figure 11:
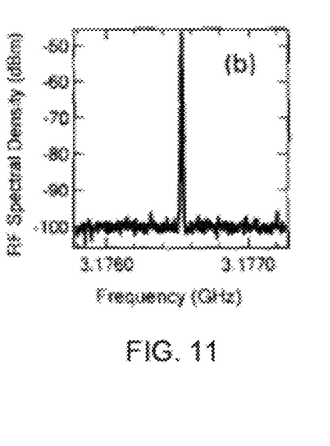
FIG. 11 shows the radiofrequency spectrum for one of the comb lines from FIG. 10 with a span of 2 MHz.
Figure 12:
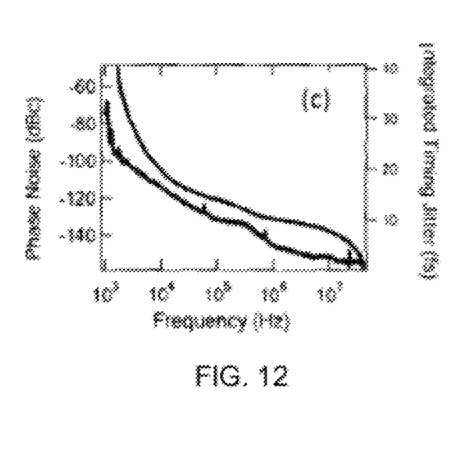
FIG. 12 shows phase noise measurement and integrated timing jitter starting from 40 MHz down to 1 kHz.

FIG. 10 shows the measured RF signal using a 10-GHz photodetector. FIG. 11 shows one of the RF comb lines with a 3-kHz resolution bandwidth indicating clean mode-locked operation with a noise suppression better than 55 dB. Because the timing jitter is the critical characteristic for many applications, measurements of the timing jitter were carried out using an HP 5052a signal source analyzer. FIG. 12 shows the single-sideband phase-noise measurement and the timing jitter progressively integrated from 40 MHz down to 1 kHz. The timing jitter integrated from 10 kHz to 40 MHz was 19 fs.

Figure 13:
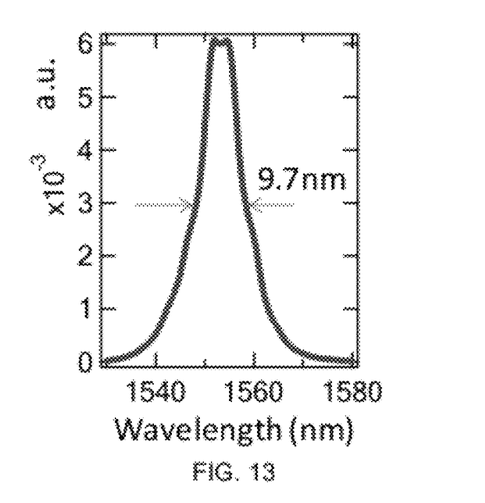
FIG. 13 shows the spectrum as a function of wavelength in an embodiment where a 7.35-cm erbium-doped fiber was used with a repetition rate of 2 GHz.

In another embodiment, a setup very similar to that described, above, was used, except a longer (7.35 cm) erbium-doped fiber was used with a repetition rate of 2 GHz. In this embodiment, a broader optical bandwidth of 9.7 nm was obtained, as shown by the intensity plot over the optical spectrum at a pump power of 650 mW, as shown in FIG. 13 (compared with a bandwidth of 5.3 nm in the previous embodiment, as shown in FIG. 8).

7. Experimental Implementation #2

This experiment demonstrates a 394-MHz, self-starting, passively mode-locked femtosecond laser based on planar silica waveguide technology. The laser generates 440-fs pulses with an average output power of 1.2 mW for a pump power of 400 mW.

Figure 14:
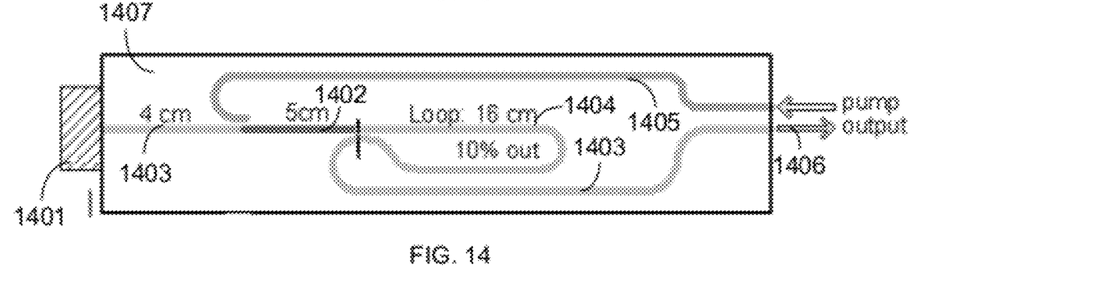
FIGS. 14 and 15 show an ingrated laser layout used in a second experimental implementation and a plot of the resulting dispersion and reflectance of the saturable absorber as a function of wavelength.
Figure 15:
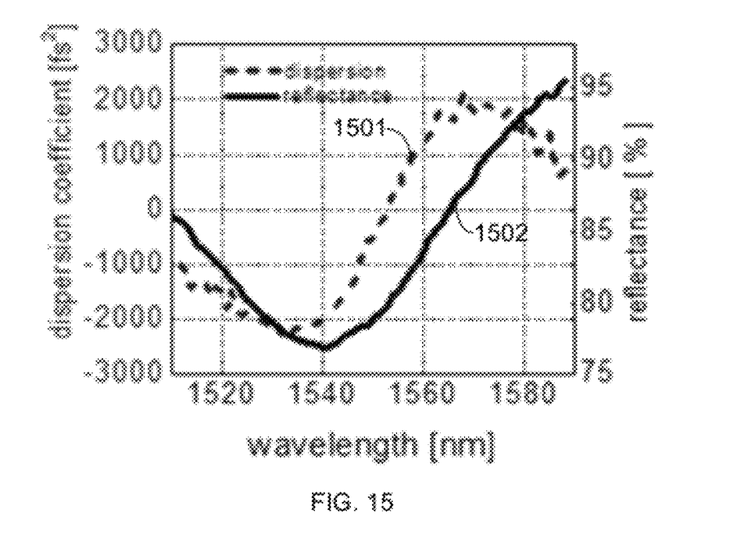

The experimental setup is depicted in FIG. 14. The laser cavity includes a 5-cm section of erbium-doped aluminosilicate waveguide 1402 with a group-velocity dispersion of 30 $fs^2$/mm. A 20-cm section of phosphorous-doped silica waveguide 1403 with a dispersion of −25 $fs^2$/mm was used to obtain a net anomalous intracavity dispersion to enable soliton mode-locking. The Er-doped section 1402 and the P-doped silica-glass section 1403 had an effective mode area of 10 $\mu m^2$ and 40 $\mu m^2$, respectively. A loop mirror 1404 was used at one end to provide 10% output coupling, while the other end was butt-coupled to an external saturable Bragg reflector 1401. The saturable Bragg reflector 1401 was a commercial unit with 14% modulation depth, a 2-ps recovery time, and a saturation fluence of 25 $\mu J/cm^2$. The dispersion coefficient 1501 and reflectance 1502 of the saturable Bragg reflector are plotted in FIG. 15 as a function of wavelength. Pump power was provided by an external 980-nm laser diode 1405 coupled into the waveguide chip 1407. The laser was operated with 400 mW of cavity-coupled pump power; the intracavity signal power was measured to be 12 mW, corresponding to a 30-pJ intracavity pulse energy. The output pulses 1406 with an average power of 1.2 mW were then amplified to 18 mW using an EDFA (980 nm pump, 350 mA), detected using a 10 GHz photodiode, and measured with a 500-MHz sampling scope and a signal source analyzer (Agilent E5052).

Figure 16:
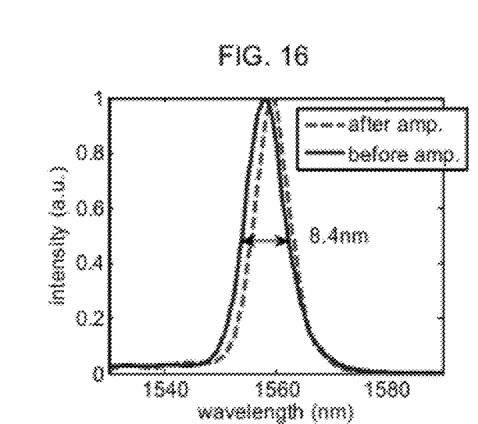
FIGS. 16-21 show the following measurement traces from the second experimental implementation at 394 MHz: normalized optical spectrum before and after amplification (FIG. 16); RF spectrum (3-GHz span, 10-MHz resolution) (FIG. 17); RF spectrum (100-kHz span, 500-Hz resolution) (FIG. 18); 10-second persistence trace (FIG. 19); background-free autocorrelation trace (FIG. 20) and single side band (SSB) phase noise of the first harmonic of the laser (FIG. 21).
Figure 17:
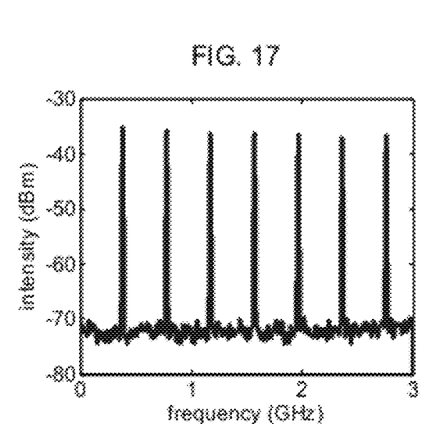
Figure 18:
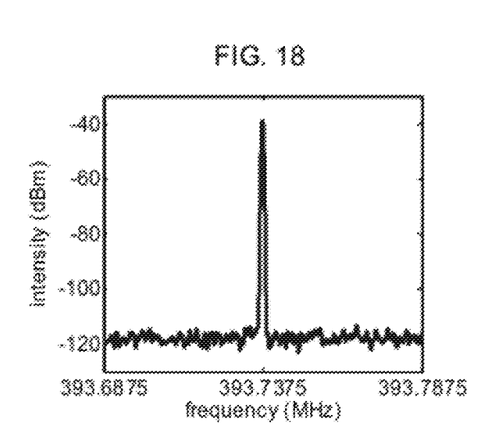
Figure 19:
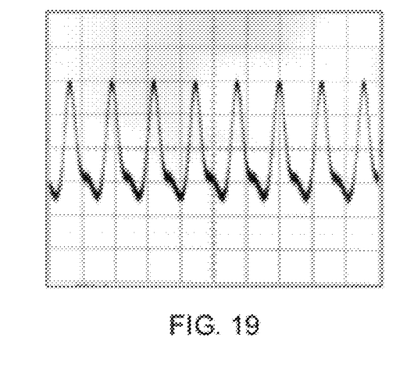
Figure 20:
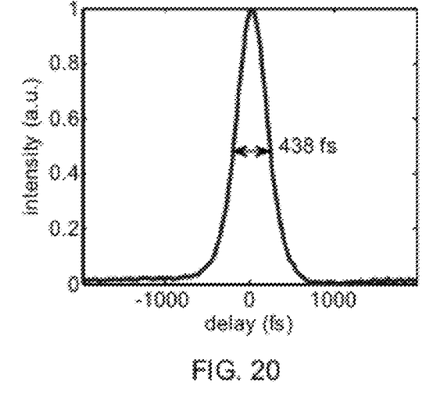
Figure 21:
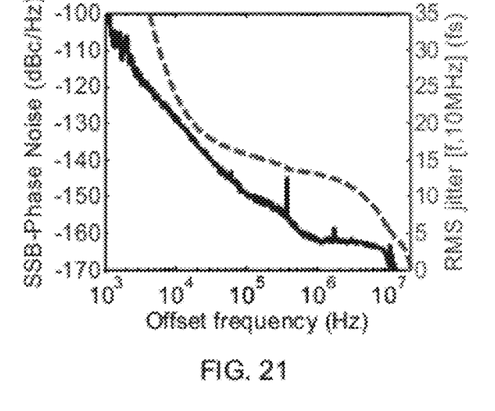

FIGS. 16-21 depict the measurement results. The persistence trace (FIG. 19) shows excellent signal stability, while the RF spectrum in FIG. 18 indicates a side-mode suppression ratio of 80 dB. The 8.4-nm FWHM optical bandwidth, as shown in FIG. 16, before amplification implies 300-fs-duration transform-limited pulses. The frequency of the pulses is consistent at multiples of about 400 MHz, as shown in FIG. 17. After amplification, the optical bandwidth decreases to 7.4 nm, as shown with the dashed plot in FIG. 16, corresponding to 340 femtoseconds (fs). The autocorrelation measurement yielded a pulse duration of 440 fs, as shown in FIG. 20. The difference is attributed to incomplete compensation of the chirp added by the erbium-doped fiber. The laser was self-starting; as the pump power was increased, the laser first operated in a mode-locked Q-switching state before transitioning to a continuous-wave soliton mode-locked state at a pump power of 160 mW. FIG. 21 shows the phase noise (solid line) of the first harmonic (394 MHz) of the laser (as seen in FIG. 18). The timing jitter integrated from 20 MHz progressively down to 1 kHz is also shown in FIG. 21 (dashed line). The timing jitter integrated from 10 kHz to 20 MHz is 24 fs.

8. Experimental Implementation #3

In this experiment, an integrated pulse interleaver and amplifier were used to increase the frequency of the pulse train in a waveguide chip to provide an actual demonstration of the accuracy that can be achieved when fabricating couplers. Waveguide chips with an integrated pulse interleaver twice interleaved a 500 MHz pulse train to become a 2 GHz pulse train.

Figure 22:
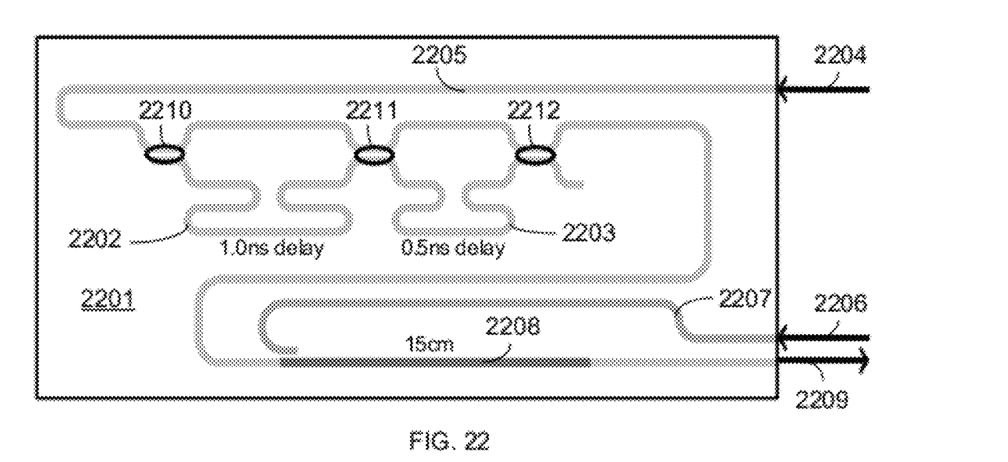
FIG. 22 is an illustration of a two-stage integrated pulse interleaver and amplifier for increasing the frequency of the pulse train.

A waveguide chip 2201 with a two-stage interleaver structure 2202 and 2203 and an amplifier 2204 is shown in FIG. 22. The components of the waveguide chip were obtained from CyOptics of Breinigsville, Pa. A pulse train 2204 was supplied from a 41.2 MHz erbium-fiber laser and passed through fused silica fiber 2205 having sectional dimensions (orthogonal to the direction of pulse travel) of 4 µm×1.5 µm. The input pulse was split into two paths and rejoined at a series of 50:50 splitters 2210, 2211 and 2212. After the pulse train was split by first splitter 2210, the first stage of the interleaver 2202 (also formed of fused silica fiber), due to its longer length compared with the top pathway, added a delay of 1 nanosecond (ns) to the pulse train passing through this path. This process is called "interleaving." At the second splitter 2211, the pulse trains were recombined and split again as the second stage of the interleaver 2203 (likewise formed of fused silica fiber) adds a delay of 0.5 ns. In this way, a 500 MHz pulse train (i.e., a 2 ns separation between pulses) had its repetition rate increased by a factor of four to produce a 2 GHz pulse train (i.e., a 0.5 ns separation between pulses) at the output of the two stages of interleaver. Before exiting the waveguide chip 2201, the pulse train is amplified by a 980 nm pump 2207 at an erbium-doped section 2208 of the fiber waveguide.

Figure 23:
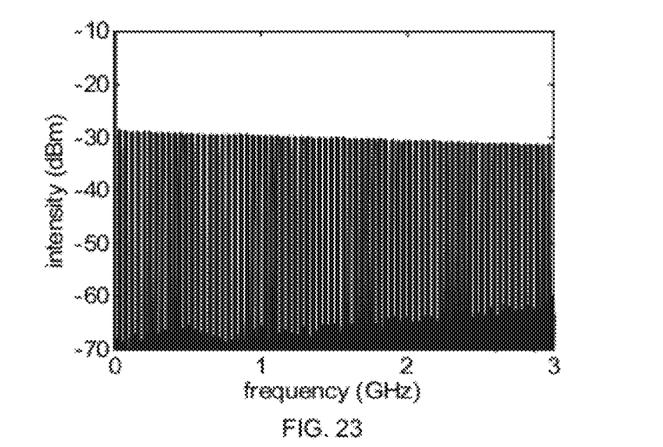
FIG. 23 shows the radiofrequency spectrum of the input pulse train fed to the apparatus of FIG. 22.
Figure 24:
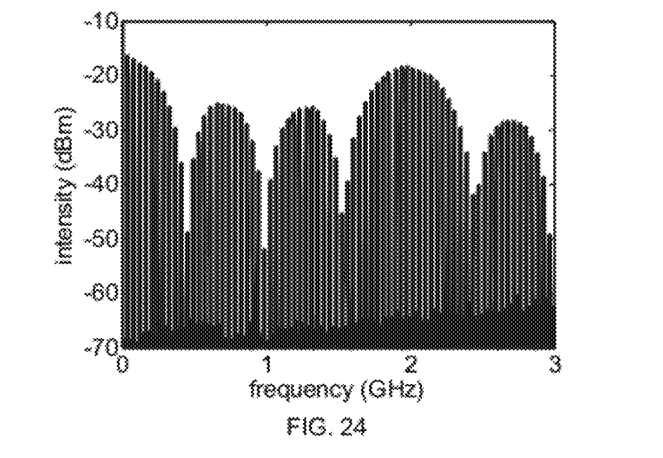
FIG. 24 shows the frequency profile of the pulse train after interleaving in the apparatus of FIG. 22.

The radiofrequency spectrum of the input pulse train is shown in FIG. 23, where a near-consistent intensity level was found across the spectrum of frequencies from 0-3 GHz, and where a contrast of about 35 dB was observed. After the two-stage interleaving process, the resulting frequency profile is seen in FIG. 24. In particular, note that the intensity drops off at 0.5 GHz frequency intervals in FIG. 24 due to destructive interference at these frequencies as a result of the dual-interleaving process (first at 1 GHz intervals in the first stage and then again at 0.5 GHz intervals in the second stage of the interleaver).

Figure 25:
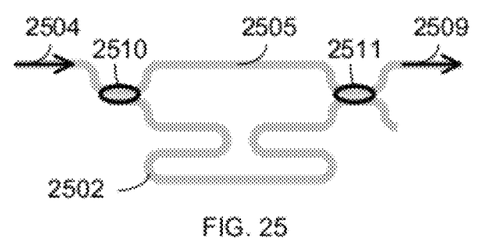
FIG. 25 is an illustration of a single-stage interleaver.

For ease of illustration, a single stage of the interleaver is shown in FIG. 25, wherein the bottom path of the interleaver 2502, due to its extended length, adds a delay of ½ the period between pulses in the input pulse train to the portion of the pulse train directed through the bottom path from 50:50 splitter 2510 compared with the portion of the pulse train that remains in the top fused-silica fiber path 2505.

Figure 26:
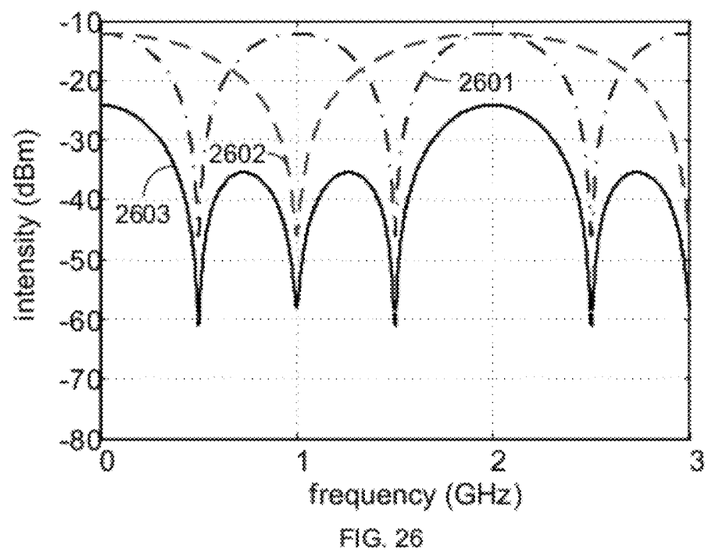
FIG. 26 plots the intensity profile as a function of frequency from a simulation interleaver of FIG. 25.
Figure 27:
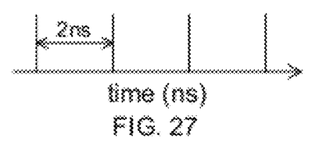
FIG. 27 plots the repetition of the input pulse train as a function of time for the input pulse train in FIG. 25.

A simulation of the resulting intensity across the frequency domain for a two-stage interleaver (including two stages in series, as shown in FIG. 22) with delays of 1 ns and 0.5 ns in the two stages, respectively, is plotted in FIG. 26, wherein the intensity as a function of frequency due to interleaving with the 1 ns delay is plotted as line 2601; the intensity as a function of frequency due to interleaving with the 0.5 ns delay is plotted as line 2602; and the intensity as a function of frequency for combined pulses after the two interleaving stages (i.e., the product of plots 2601 and 2602 at each frequency is plotted as line 2603. In this embodiment, the coupling ratio was 50.5%. The intensity for the input pulse train 2504 is expressed as a function of time (t), i.e., f(t); and the intensity of the output pulse train can be expressed as:

$$\frac{1}{4}(f(t)+f(t-T/2)) \leftrightarrow \frac{1}{4}(1+\exp(-iT\omega/2))F(\omega).$$

Although the basic principle of pulse interleaving can be understood in the time domain, the performance of an interleaver can be better described in the frequency domain. For a single-stage-interleaver, input pulse train is split into two paths, one of which is delayed by T/2, where T is the period of input pulse. When the two paths are combined, the output can be expressed in (f(t)+f(t−T/2))/4 in time domain. (f(t)+f(t−T/2))/4 corresponds to (1+exp(−iTω/2))/4F(ω) in the frequency domain using the following relations: f(t)↔F(ω) and f(t−a)↔$e^{-ia\omega}$F(ω). Accordingly, the frequency response of the interleaver is provided.

Figure 28:
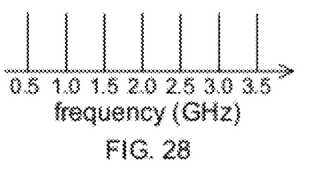
FIG. 28 plots the rf-spectrum of the input pulse train as a function of frequency for the input pulse train in FIG. 25.

A comparison of the pulse delay and frequency domain of the input pulse train 2504 with those of the output pulse train 2509 for the single-stage interleaver of FIG. 25 is provided in FIGS. 27-31. Specifically, the repetition of the input pulse train is shown in the time domain in FIG. 27, wherein the pulses are separated by 2 ns, while the intensity over the frequency domain of the input pulse train 2504 is shown in FIG. 28 (showing a repetition rate of 0.5 GHz).

Figure 29:
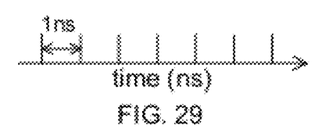
FIG. 29 plots the repetition of the output pulse train as a function of time for the output pulse train in FIG. 25.
Figure 30:
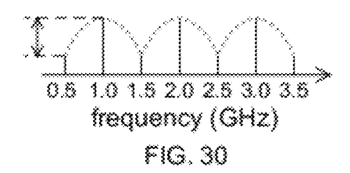
FIGS. 30 and 31 plot the frequency of the output pulse train in FIG. 25, wherein the plot of FIG. 31 exhibits greater suppression of undesired frequency components at the fundamental repetition rate.
Figure 31:
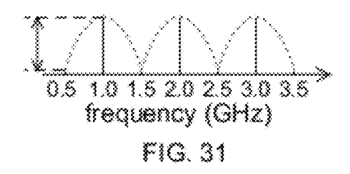

The pulse delay for the output pulse train 2509 is shown to be 1 ns in FIG. 29, and the pulse repetition rate accordingly is 1 GHz (twice that of the input pulse train 2504). The output pulse train's frequency domain can look very different depending on the interleaver suppression ratio; an interleaver with greater suppression removes unwanted frequency components more effectively. The frequency output shown in FIG. 31 exhibits greater suppression than the frequency output shown in FIG. 30 due to a better interleave response (illustrated via the dashed line), as shown by the arrow to the left of each plot representing the magnitude of the drop in intensity from peak to trough. In order to fabricate an interleaver with a suppression as large as possible, the coupling ratio is set as close to 50:50 as possible.

Figure 32:
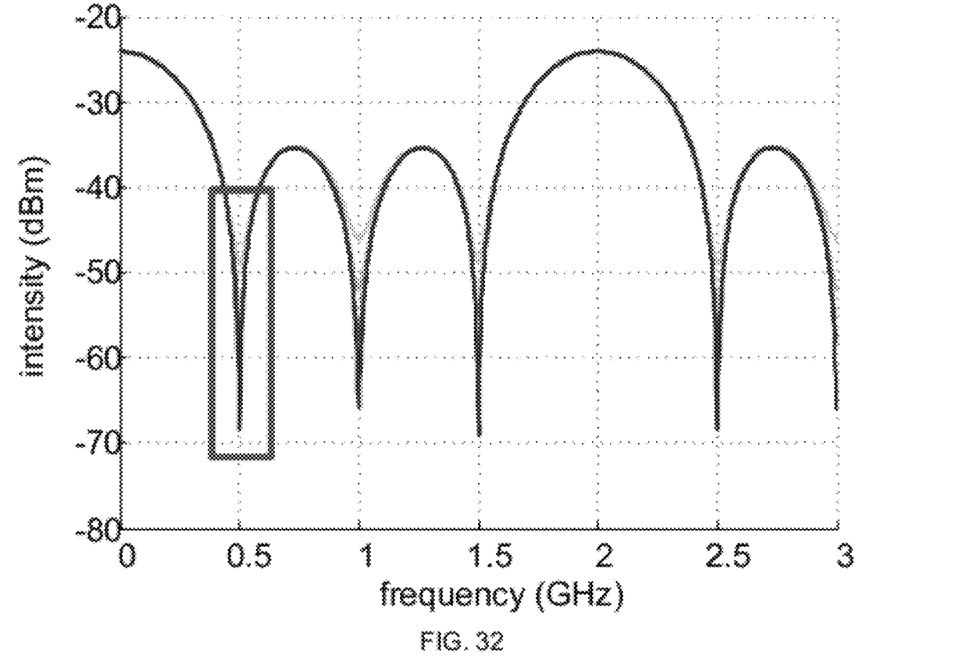
FIGS. 32 and 33 plot intensity of the output pulse train over frequency for a range of coupling ratios to show how the coupling ratio affects the suppression of an interleaver.
Figure 33:
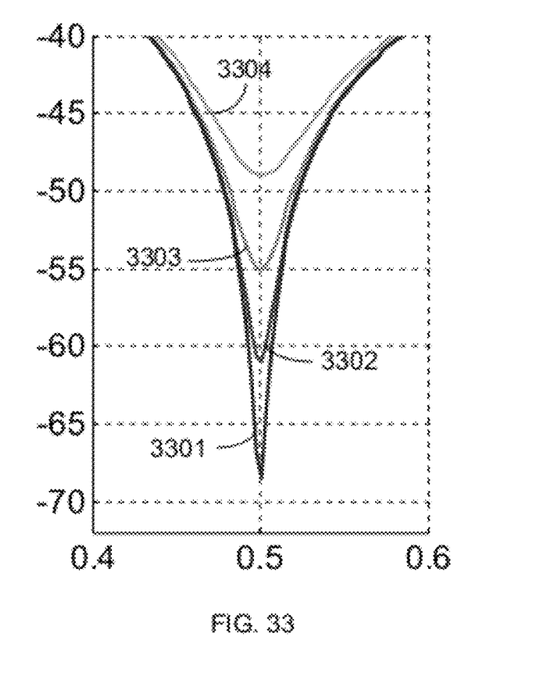

A simulation result showing how the accuracy of the coupling ratio affects the suppression of an interleaver is charted in FIG. 32. The boxed region from FIG. 33 is magnified in FIG. 33 to better illustrate the suppression ratio at different coupling ratios. As shown in FIG. 33, the plot 3301 for a coupling ratio of 50.2% achieves the highest suppression ratio (45 dB, measured from peak to trough) with the intensity accordingly plunging to the lowest depths in the troughs. Increasing the coupling ratio just to 50.5% decreases the suppression ratio to 37 db, resulting in a plot 3302 with a higher intensity in the trough. Likewise, the plots 3303 and 3304 for coupling ratios of 51% and 52%, respectively, result in suppression ratios of 31 dB and 25 dB, respectively, and accordingly produce higher intensities in the trough.

Accordingly, in order to suppress the intensity at every 0.5 GHz (except every 2 GHz) more effectively, the coupling ratio can be targeted very close to 50.0%. Only 1% deviation (i.e., a 51% coupling ratio) degrades the suppression by 14 dB. Judging from this simulation result, the fabricated interleaver can be designed with almost 0.5% accuracy, which is good enough for many embodiments. In the coupler, two waveguides or fibers can be put together close enough (but not attached, usually separated only by several tens or hundreds of nanometers) in order to induce coupling. The coupling ratio depends on the length of the coupled region and how closely two waveguides are separated.

In describing embodiments of the invention, specific terminology is used for the sake of clarity. For purposes of description, each specific term is intended to at least include all technical and functional equivalents that operate in a similar manner to accomplish a similar result. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Further, where parameters for various properties are specified herein for embodiments of the invention, those parameters can be adjusted up or down by $1/100^{th}$, $1/50^{th}$, $1/20^{th}$, $1/10^{th}$, $1/5^{th}$, $1/3^{rd}$, $1/2$, $3/4^{th}$, etc. (or up by a factor of 2, 5, 10, etc.), or by rounded-off approximations thereof, unless otherwise specified. Moreover, while this invention has been shown and described with references to particular embodiments thereof, those skilled in the art will understand that various substitutions and alterations in form and details may be made therein without departing from the scope of the invention; further still, other aspects, functions and advantages are also within the scope of the invention. Additionally, steps, elements and features discussed herein in connection with one embodiment can likewise be used in conjunction with other embodiments. The contents of all references, including reference texts, journal articles, patents, patent applications, etc., cited throughout the text are hereby incorporated by reference in their entirety. Appropriate components and methods of those references may be selected for the invention and embodiments thereof. Still further, the components and methods identified in the Background section are integral to this disclosure and can be used in conjunction with or substituted for components and methods described elsewhere in the disclosure within the scope of the invention.

What is claimed is:

1. A method for generating a high-repetition-rate guided-mode femtosecond laser comprising:
    providing a laser comprising the following cavity components: a saturable absorption device, a reflector, and a waveguide extending between the saturable absorption device and the reflector;
    generating a single optical pulse traversing the waveguide in the form of a soliton via fundamental modelocking, wherein the cavity components increase the intensity of the pulse and provide a balance of dispersion and nonlinearity to provide the soliton with a pulsewidth of no more than 500 femtoseconds; and
    emitting output optical pulses at a repetition rate of at least 500 MHz and with a pulsewidth of no more than 500 femtoseconds from the soliton in the waveguide.

2. The method of claim 1, wherein the optical pulse is provided by injecting optical pump light through the reflector into the waveguide.

3. The method of claim 1, wherein the optical pulse is extracted from the cavity through the reflector.

4. The method of claim 1, wherein the length of the waveguide is no more than 6 cm.

5. The method of claim 1, wherein the pulse does not pass through any stretches of free space in the laser.

6. The method of claim 1, wherein the pulse does not pass through any lenses in the laser.

7. The method of claim 1, wherein the saturable absorption device has a recovery time of at most 10 ps.

8. The method of claim 1, wherein the waveguide comprises an active waveguide joined with a passive waveguide, wherein the passive waveguide provides dispersion or nonlinearity to compensate for or temper the dispersion or nonlinearity in the active waveguide.

9. The method of claim 1, wherein the reflector includes a coating that provides dispersion to compensate for or temper the dispersion in the waveguide.

10. The method of claim 1, wherein the pulse has a repetition rate of at least 1 GHz.

11. The method of claim 1, further comprising tuning the nonlinearity of the waveguide by adjusting the waveguide temperature or by adjusting the pump power.

12. The method of claim 1, wherein the cavity components provide negative dispersion and positive nonlinearity.

13. The method of claim 1, wherein the cavity components provide positive dispersion and negative nonlinearity.

14. A high-repetition-rate guided-mode femtosecond laser comprising a laser cavity with cavity components including:
    a saturable absorption device;
    a partial reflector; and
    a waveguide extending no more than 20 cm from the saturable absorption device to the partial reflector, wherein the cavity components are structured to produce a single optical pulse traversing the waveguide in the form of a soliton via fundamental modelocking, to increase the intensity of the soliton, to emit output optical pulses from the soliton, and to provide a balance of dispersion and nonlinearity to provide the output optical pulses with a repetition rate of at least 500 MHz and a pulsewidth of no more than 500 femtoseconds.

15. The high-repetition-rate guided-mode femtosecond laser of claim 14, wherein the waveguide has two opposite ends and is coupled at one end with the saturable absorption device and at the other end with the partial reflector.

16. The laser of claim 14, wherein the laser is a solid-state erbium laser.

17. The laser of claim 14, wherein the waveguide is a planar waveguide and not a fiber.

18. The laser of claim 14, wherein the saturable absorption device is a semiconductor saturable absorber.

19. The laser of claim 14, wherein the saturable absorption device comprises a second reflector and a saturable absorber, wherein the second reflector bounds the waveguide and the saturable absorber is positioned alongside the waveguide.

20. The laser of claim 14, wherein the saturable absorption device is structured to produce intensity-dependent loss in an optical pulse via the Kerr Effect.

21. The laser of claim 20, wherein the saturable absorption device comprises:
    a directional coupler to split the input power;
    two passive waveguide sections with different nonlinearities provided by different material selection or different mode area;
    a directional coupler to combine the power from the two passive waveguide sections; and
    an apparatus to induce an optical phase change over one of the said two passive waveguide sections.

22. The laser of claim 21, wherein the apparatus for inducing the optical phase change is a heating pad.

23. The method of claim 1, wherein the waveguide is in the form of a ring.

24. The laser of claim 14, wherein the waveguide is in the form of a ring.

25. The laser of claim 14, wherein the length of the waveguide is no more than 6 cm.

* * * * *